(12) United States Patent
Pip et al.

(10) Patent No.: US 7,790,281 B2
(45) Date of Patent: Sep. 7, 2010

(54) TEMPORARY SURFACE PROTECTION FILM

(75) Inventors: Hans Joachim Pip, Overijse (BE); Anne Vera Macedo, Brussels (BE); Jurgen Schroeyers, Helchteren (BE)

(73) Assignee: ExxonMobil Chemical Patents Inc., Houston, TX (US)

( * ) Notice: Subject to any disclaimer, the term of this patent is extended or adjusted under 35 U.S.C. 154(b) by 532 days.

(21) Appl. No.: 11/445,791

(22) Filed: Jun. 2, 2006

(65) Prior Publication Data

US 2007/0020471 A1 Jan. 25, 2007

Related U.S. Application Data

(60) Provisional application No. 60/700,896, filed on Jul. 19, 2005.

(51) Int. Cl.
*B32B 15/04* (2006.01)
*B32B 7/12* (2006.01)
*C08L 23/00* (2006.01)
*C08L 23/04* (2006.01)

(52) U.S. Cl. .................. 428/355 R; 428/343; 428/354; 428/355 RA; 428/355 EN; 525/240; 525/222

(58) Field of Classification Search ................. 525/191, 525/240, 222; 428/520, 522, 523, 343, 354, 428/355 R, 355 RA, 355 EN
See application file for complete search history.

(56) References Cited

U.S. PATENT DOCUMENTS

| | | | | |
|---|---|---|---|---|
| 4,367,113 A | * | 1/1983 | Karim et al. ................. | 156/327 |
| 5,154,981 A | * | 10/1992 | Brant et al. .................. | 428/520 |
| 5,635,286 A | * | 6/1997 | Morita et al. ................ | 428/213 |
| 5,837,369 A | * | 11/1998 | Grunberger et al. .......... | 428/349 |
| 6,111,027 A | * | 8/2000 | Wright et al. ................ | 525/301 |
| 6,500,563 B1 | * | 12/2002 | Datta et al. .................. | 428/521 |
| 2002/0150781 A1 | * | 10/2002 | Wanic et al. ................. | 428/500 |
| 2003/0068514 A1 | * | 4/2003 | Sperlich et al. ............. | 428/516 |
| 2003/0091817 A1 | * | 5/2003 | Amano ........................ | 428/343 |
| 2004/0053067 A1 | * | 3/2004 | Dharmarajan et al. ....... | 428/521 |
| 2004/0115458 A1 | * | 6/2004 | Kong .......................... | 428/515 |
| 2004/0126518 A1 | | 7/2004 | Mendes et al. ............. | 428/34.8 |
| 2004/0157077 A1 | * | 8/2004 | Roussos ..................... | 428/518 |
| 2004/0249046 A1 | * | 12/2004 | Abhari et al. ............... | 524/474 |
| 2006/0159943 A1 | * | 7/2006 | Brant et al. ................. | 428/515 |

FOREIGN PATENT DOCUMENTS

| | | |
|---|---|---|
| EP | 1 017 751 | 7/2000 |
| WO | WO 91/06609 | 5/1991 |
| WO | WO 95/16729 | 6/1995 |
| WO | WO 03/025036 * | 3/2003 |
| WO | WO 03/039860 | 5/2003 |

OTHER PUBLICATIONS

U.S. Appl. No. 11/039,090, filed Jan. 19, 2005, entitled "Stretch-Cling Films", Brant et al.

* cited by examiner

*Primary Examiner*—Vasu Jagannathan
*Assistant Examiner*—Irina Krylova

(57) ABSTRACT

The invention relates to a film for surface protection having at least one base layer and a surface layer for removably adhering to a substrate comprising at least 40 wt % of an elastomeric propylene-based polymer with a heat of fusion derived from isotactic propylene type crystallinity as determined by DSC of less than 40 J/g and optionally an ethylene-based polymer in the form of an ethylene-alpha-olefin copolymer having a density of less than 0.91 g/cm$^3$ and/or an ethylene-vinyl ester copolymer having from 5 to 60 wt % of the ester derived units and/or optionally less than 40 wt % of a propylene based polymer having a heat of fusion of greater than 70 J/g. The films have good initial tack.

6 Claims, No Drawings

TEMPORARY SURFACE PROTECTION FILM

CROSS REFERENCE TO RELATED APPLICATION

This application claims the benefit of Provisional Application No. 60/700,896 filed Jul. 19, 2005, the disclosure of which is incorporated by reference.

FIELD OF INVENTION

The invention relates to a temporary surface protection film for use particularly in temporarily protecting surfaces of vulnerable materials such as plastics, metals and ceramics in the course of manufacture, storage and transportation. Such films are referred to herein as TSP films.

BACKGROUND

TSP films are described in WO 91 06609. Use of tackifying extractable additives is reduced or eliminated by using special ethylene vinyl acetate copolymers. WO 95/16729 describes a non-acrylate cling film for use in cling or stretch wrapping using a low density ethylene higher alpha-olefin copolymer having between 3 and 20 carbon atoms to provide the cling force. U.S. application Ser. No. 11/039,090 filed on Jan. 19, 2005, discloses films comprising a non-cling layer of polyolefin and a cling layer of an elastomeric propylene-based polymer with a heat of fusion derived from isotactic propylene type crystallinity as determined by DSC of less than 40 J/g blended with a crystalline isotactic propylene derived polymer having a heat of fusion over 70 J/g and/or a melting point of at least 120° C. as determined by DSC. These films may be made by coextrusion techniques.

It is among the objects of the invention to provide a film having good immediate tack on the substrate, adequate but not excessive adhesions to permit removal without tearing the film; and/or good release properties, even after exposure to heat.

SUMMARY

The invention provides a film for surface protection having at least one base layer and a surface layer for removably adhering to a substrate comprising at least 40 wt % of an elastomeric propylene-based polymer with a heat of fusion derived from isotactic propylene type crystallinity as determined by DSC of less than 40 J/g and optionally an ethylene-based polymer in the form of an ethylene-alpha-olefin copolymer having a density of less than 0.91 g/cm$^3$ or an ethylene-vinyl ester copolymer having from 5 to 60 wt % of the ester derived units and/or optionally less than 40 wt % of a propylene based polymer having a heat of fusion of greater than 70 J/g. In one embodiment, the base layer comprises a low density polyethylene produced by high pressure polymerization and/or an interpolymer of ethylene and an alpha olefin having from 3 to 12 carbon atoms and a heat of fusion of at least 80 J/g and/or a density of form 0.915 to 0.94 g/cm$^3$.

Non-adhering Layers

The film may have on the other surface thereof a non-adhering layer of a polyolefin with reduced levels of or essentially free of tackifier, and optionally include an anti-cling (slip and/or antiblock) additive. Preferred polyolefins include linear polyethylene which may be a linear low density polyethylene (LLDPE) containing units derived from ethylene and at least one alpha-olefin having from 3 to 12 carbon atoms and having a density of from 0.910 to 0.940 g/cm$^3$, and polypropylene homo or random copolymer having up to 10 wt % of ethylene. The film may have a non-adhering layer comprising a free-radical initiated low density polyethylene having a highly branched structure, generally known as LDPE.

The film may have one or more intermediate layers. An intermediate layer may be an LLDPE as defined above to improve the impact strength. LLDPE prepared by single site catalysis, such as a metallocene based catalyst system, are preferred. In another embodiment, an intermediate layer may comprise an interpolymer of ethylene and an alpha-olefin having from 3 to 12 carbon atoms and a heat of fusion of at least 80 J/g and/or a density of from 0.915 to 0.94 g/cm$^3$, preferably higher than the base layer.

The Adhesion Imparting Layer

The adhesion imparting layer may be of a composition, which comprises a blend of a propylene-based elastomeric polymer and a low density ethylene based copolymer with a density of less than 0.91 g/cm$^3$. The propylene-based elastomeric polymer is preferably present in the blend from at least 50 wt %, 70-95 wt %, more preferably from 80-95 wt %, more preferably from 80-90 wt %, more preferably from 85-95 wt % based on the weight of the blend, with the balance comprising the ethylene based low density copolymer and less than 40 wt % of crystalline polypropylene homo or copolymer.

Propylene based elastomeric polymers are produced by random polymerization processes leading to polymers having randomly distributed irregularities in stereoregular propylene propagation. This is in contrast to block copolymers in which constituent parts of the same polymer chains are separately and sequentially polymerized.

The term "elastomeric polymer" indicates that the heat of fusion of the polymer as determined by DSC is less than 75 J/g. Generally the melting point as determined by DSC will below 105° C. This is in contrast to propylene copolymers or atactic polymers containing propylene derived units, which lack recovery from elastic deformation.

The polymer is "propylene based" in the sense that the amount of propylene in the polymer is for propylene sequences to crystallize to give rise to a detectable heat of fusion. This is in contrast with known elastomeric polymers based on ethylene and propylene in which the heat of fusion can be attributed to ethylene derived polymer sequences. Preferably the polymers contain isotactic propylene sequences, separated by stereo or regio error or by one or more units from a comonomer. Preferred propylene-based elastomers include Vistamaxx™ elastmers available for ExxonMobil Chemical Company, Versify™ elastomers available from Dow Chemical Company, and Tafmers™ XM elastomers available from Mitsui Chemicals.

Preferred Heat of Fusion

The pre-based elastomeric polymers described herein can be characterized in terms of their melting points (Tm) and heats of fusion. These properties can be influenced by the presence of comonomers or stereo irregularities that hinder the formation of crystallites by the polymer chains.

The heat of fusion preferably ranges from a lower limit of 1.0 J/g, or 1.5 J/g, or 3.0 J/g, or 4.0 J/g, or 6.0 J/g, or 7.0 J/g, to an upper limit of 30 J/g, or 40 J/g, or 50 J/g, or 60 J/g. Here and everywhere else, any lower range end may be combined with an upper range end to provide alternative ranges.

If the heat of fusion is too high, the polymer may not extend elastically under a sufficiently low force for elastic deformation and have insufficient elastic elongation. If the heat of fusion is too low the polymer may not show a sufficient return force after elastic deformation.

The heat of fusion can be reduced by using additional comonomer, higher polymerization temperatures and/or a different catalyst providing reduced levels of steric constraints and favoring more propagation errors for propylene insertion.

The properties can be determined by Differential Scanning Calorimetry (DSC), using the ASTM E-794-95 (version E-794-01).

About 6 to 10 mg of a sheet of the polymer pressed at approximately 200° C. to 230° C. is removed with a punch die and annealed at room temperature for 48 hours. At the end of this period, the sample is placed in a Differential Scanning Calorimeter (Perkin Elmer Pyris Analysis System) and cooled to about −50° C. to −70° C. The sample is heated at about 20° C./min to attain a final temperature of about 180° C. to 200° C. The term "melting point," as used herein, is the highest peak among principal and secondary melting peaks as determined by DSC, discussed above. The thermal output is recorded as the area under the melting peak of the sample, which is typically at a maximum peak at about 30° C. to about 175° C. and occurs between the temperatures of about 0° C. and about 200° C. The thermal output is measured in Joules as a measure of the heat of fusion. The temperature of the greatest heat absorption within the range of melting of the sample is recorded as the melting point.

A crystallinity percentage can be calculated from the heat of fusion relative to the heat of fusion of an ideal polypropylene material with maximum crystallinity.

Randomness by Isotacticity Index

The term "tacticity" refers to the stereoregularity of the orientation of the methyl residues from propylene in a polymer. The term "isotactic" as in isotactic polypropylene is defined herein as a polymer sequence in which greater than 50% of the pairs of pendant methyl groups located on adjacent propylene units, which are inserted into the chain in a regio regular 1,2 fashion and are not part of the backbone structure, are located either above or below the atoms in the backbone chain, when such atoms in the backbone chain are all in one plane.

Pairs of methyl residues from contiguous propylene units identically inserted which have the same orientation with respect to the polymer backbone are termed "meso" (m). Those of opposite configuration are termed "racemic" (r). When three adjacent propylene groups have methyl groups with the same orientation, the tacticity of the triad is 'mm'. If two adjacent monomers in a three-monomer sequence have the same orientation, and that orientation is different from the relative configuration of the third unit, the tacticity of the triad is 'mr'. When the middle monomer unit has an opposite configuration from either neighbor, the triad has 'rr' tacticity. The fraction of each type of triad in the polymer can be determined and when multiplied by 100 indicates the percentage of that type found in the polymer and is referred to herein as the triad tacticity.

The propylene-derived units of the propylene elastomer have an isotactic triad fraction of about 65% to about 99%. Advantageously the propylene-derived units of the propylene elastomer have an isotactic triad fraction of 70% to 98%. In still another embodiment, the propylene-derived units of the propylene elastomer have an isotactic triad fraction of 75% to 97%.

If the triad tacticity is too high, the level of stereo-irregular disruption of the chain is too low and the elastic properties will suffer. If the triad tacticity is too low, there is insufficient potential for the progressive crystallization of the polymer.

The "triad tacticity" of the polymers described herein can be determined from a $^{13}C$ nuclear magnetic resonance (NMR) spectrum of the polymer as described in U.S. Pat. Nos. 5,504,172, and 6,642,316, column 6, lines 38 through column 9, line 18, which patents are hereby incorporated by reference in their entirety.

The tacticity index, expressed herein as "m/r", is determined by $^{13}C$ nuclear magnetic resonance (NMR). The tacticity index m/r is calculated as defined in H. N. Cheng, *Macromolecules,* 17, 1950 (1984). An m/r ratio of 1.0 generally describes a syndiotactic polymer, and an m/r ratio of 2.0 generally describes an atactic material. An isotactic material theoretically may have a ratio approaching infinity, and many by-product atactic polymers have sufficient isotactic content to result in ratios of greater than 50.

The triad tacticity and tacticity index may be controlled by the catalyst influencing the stereoregularity of propylene placement, the polymerization temperature according to which stereoregularity can be reduced by increasing the temperature and by the type and amount of a comonomer which tends to reduce the level of longer propylene derived sequences.

Control of Random Polymer Structure

Preferably the polymer contains at least some comonomer, such as an alpha-olefin, in order to facilitate control of the structure. Preferably the comonomer comprises substantially ethylene which can aid in achieving economic polymerization conditions by raising the molecular weight and/or permitting a raising of the polymerization temperature.

Generally the combined amount of the ethylene and/or alpha-olefin varies from 5 to 30 wt % %, preferably from 10 to 20 wt % and especially from 12 to 20 wt %. Other suitable ranges of the ethylene and/or other alpha-olefin include 5-20 wt %, 5-15 wt %, 5.5-10.5 wt %, 6-10 wt %, 8-10 wt % and 8.5-10 wt %. Too much comonomer will reduce the crystallinity provided by the crystallization of stereoregular propylene derived sequences to the point where the material lacks elastic recovery; too little and the material will be too crystalline, have a high melting point and be insufficiently elastic.

The comonomer content and sequence distribution of the polymers can be measured using $^{13}C$ nuclear magnetic resonance (NMR) by methods well known to those skilled in the art. Comonomer content of discrete molecular weight ranges can be measured using methods well known to those skilled in the art, including Fourier Transform Infrared Spectroscopy (FTIR) in conjunction with samples by GPC, as described in Wheeler and Willis, Applied Spectroscopy, 1993, vol. 47, pp. 1128-1130. For a propylene ethylene copolymer containing greater than 75 wt % propylene, the comonomer content (ethylene content) of such a polymer can be measured as follows: A thin homogeneous film is pressed at a temperature of about 150° C. or greater, and mounted on a Perkin Elmer PE 1760 infrared spectrophotometer. A full spectrum of the sample from 600 $cm^{-1}$ to 4000 $cm^{-1}$ is recorded and the monomer weight percent of ethylene can be calculated according to the following equation: Ethylene wt %=82.585−111.987X+30.045$X^2$, where X is the ratio of the peak height at 1155 $cm^{-1}$ and peak height at either 722 $cm^{-1}$ or 732 $cm^{-1}$, whichever is higher. For propylene ethylene copolymers having 75 wt % or less propylene content, the comonomer (ethylene) content can be measured using the procedure described in the Wheeler and Willis.

The polymer may also contain polyenes to facilitate functionalization and/or cross-linking.

The polymer may incorporate from 1 wt. % to 12 wt. % of polyene-derived units, based on the combined weight of the propylene-derived units and the alpha-olefin-derived units, if any, excluding the polyenes (This is the result of the generally practiced measurement technique prescribed by ASTM D3900). Preferably the polymer incorporates from 1.0 wt. % to about 9.0 wt. % of polyene-derived units. The polyene-derived units may be derived from a diene such as 5-ethylidene-2-norbornene (ENB) which has one polymerizable bond that can be incorporated during polymerization and is not prone to branch formation because the other group is not so polymerizable. The polyene may also be a diene such 5-vinyl-2-norbornene or divinyl benzene in which both bonds can polymerize and long chain branches can be produced.

The amount of the polyene present in the polymeric components can be inferred by the quantitative measure of the amount of the pendent free olefin present in the polymer after polymerization. Several procedures such as iodine number and the determination of the olefin content by 1H or 13C NMR have been established. In the particular case where the polyene is ENB the amount of polyene present in the polymers can be measured using ASTM D3900. The amount of polyene present is expressed on the basis of the total weight of (for example) ethylene and propylene derived units.

The catalyst may also control the stereoregularity in combination with the comonomer and the polymerization temperature. The catalyst should however be capable of a level of stereoregular placement, generally by suitable chirality of the single site catalyst. The polymer can be prepared using any single sited catalyst. Such a catalyst may be a transition metal complex generally containing a transition metal from Groups 3 to 10 of the Periodic Table; and at least one ancillary ligand that remains bonded to the transition metal during polymerization. Preferably the transition metal is used in a reduced cationic state and stabilized by a cocatalyst or activator.

The ancillary ligand may be a structure capable of forming a π bond such as a cyclopentadienyl type ring structure. The ancillary ligand may also be a pyridinyl or amide ligand. The transition metal is preferably of Group 4 of the Periodic table such as titanium, hafnium or zirconium which are used in polymerization in the $d^0$ mono-valent cationic state and have one or two ancillary ligands as described in more detail hereafter. The important features of such catalysts for coordination polymerization are the ligand capable of abstraction and that ligand into which the ethylene (olefinic) group can be inserted.

The manner of activation of the single site catalyst can vary. Alumoxane and preferably methyl alumoxane can be used suitably in an amount to provide a molar aluminum to metallocene ratio of from 1:1 to 20,000:1. Higher molecular weights can be obtained using non/or weakly coordinating anion activators (NCA) derived and generated in any of the ways amply described in published patent art such as EP 277 004, EP 426 637, and many others. The non-coordinating anion can be a Group 10-14 complex wherein boron or aluminum is the charge-bearing atom shielded by ligands, which may be halogenated, and especially perfluorinated. Preferred are tetra-aryl-substituted Group 10-14 non-carbon element-based anions, especially those that have fluorine groups substituted for hydrogen atoms on the aryl groups, or on alkyl substituents on those aryl groups.

An activation step generally forms the catalytically active ion pair from neutral precursors. This reaction may involve abstraction of an anionic group such as the methyl group to form a metallocene cation, although according to some literature zwitterions may be produced. The NCA precursor may be an ion pair of a borate or aluminate in which the precursor cation is eliminated upon activation in some manner, e.g. trityl or ammonium derivatives of tetrakis pentafluorophenyl boron (See EP 277 004). The NCA precursor can be a neutral compound such as a borane, which is formed into a cation by the abstraction of and incorporation of the anionic group abstracted from the metallocene (See EP 4266 38). A precursor for the non-coordinating anion may be used with a transition metal complex supplied in a reduced valency state. The precursor may undergo a redox reaction. The precursor cation may be a triphenyl carbenium derivative as in EP 426 637.

The non-coordinating anion may be used in approximately equimolar amounts relative to the transition metal complex, such as at least 0.25, preferably 0.5, and especially 0.8 and such as no more than 4, preferably 2 and especially 1.5.

The transition metal complex for the single site catalyst may be a pyridine amine complex useful for olefin polymerization such as those described in WO03/040201. The transition metal complex may be a fluxional complex, which undergoes periodic intra-molecular re-arrangement so as to provide the desired interruption of stereoregularity as in U.S. Pat. No. 6,559,262. The transition metal complex may be a stereorigid complex with mixed influence on propylene insertion, see Rieger EP 1 070 087.

Preferably the transition metal complex is a chiral metallocene catalyst with an activator and optional scavenger. Mono-anionic ligands of the metallocene are displaceable by a suitable activator to permit insertion of a polymerizable monomer or macro-monomer can insert for coordination polymerization on the vacant coordination site of the transition metal component. Such metallocenes are described in U.S. Pat. No. 6,048,950 which discloses bis(indenyl)bis(dimethylsilyl) zirconium dichloride and MAO; WO 98/27154 which discloses a dimethylsilyl bridged bis-indenyl hafnium di-methyl together with a non-coordinating anion activator. EP 1 070 087 discloses a bridged biscyclopentadienyl catalyst which has elements of asymmetry between the two cyclopentadienyl ligands to give a polymer with elastic properties. Also available are the metallocenes described in U.S. Pat. Nos. 6,448,358 and 6,265,212, 5,198,401 and 5,391,629.

Possible other single site catalysts are metallocenes, such as those described in U.S. Pat. No. 5,026,798, which have a single cyclopentadienyl ring, advantageously substituted and/or forming part of a polycyclic structure, and a heteroatom, generally a nitrogen atom, but possibly also a phosphorus atom or phenoxy group connected to a group 4 transition metal, preferably titanium but possibly zirconium or hafnium. A further example is $Me_5 CpTiMe_3$ activated with $B(CF)_3$ as used to produce elastomeric polypropylene with an Mn of up to 4 million. See Sassmannshausen, Bochmann, Rosch, Lilge, J. Organomet. Chem. (1997) 548, 23-28.

When using the catalysts, the total catalyst system will generally additionally comprise one or more organo-metallic compound as scavenger. Such compounds as used in this application is meant to include those compounds effective for removing polar impurities from the reaction environment and for increasing catalyst activity.

The polymerization reaction is conducted by reacting monomers in the presence of a catalyst system described herein at a temperature of from 0° C. to 200° C. for a time of from 1 second to 10 hours. Preferably homogeneous conditions are used such as a continuous solution process or a bulk polymerization process with excess monomer used as diluent. Preferably the continuous process uses some form of agitation to reduce concentration differences in the reactor and maintain steady state polymerization conditions. The heat of the polymerization reaction is preferably removed by cooling of the polymerization feed and allowing the polymerization to heat up to the polymerization, although internal cooling systems may be used.

As noted elsewhere herein, polymerizations in the different reactors may in certain embodiments be conducted in the presence of the same catalyst mixtures, and in other embodiments be conducted in the presence of different catalyst mixtures. As used herein, the term "catalyst mixture" (catalyst system) includes at least one catalyst and at least one activator, although depending on the context, any reference herein to "catalyst" usually also implies an activator as well.

The appropriate catalyst mixture may be delivered to the respective reactor as a solution or slurry, either separately to the reactor, activated in-line just prior to the reactor, or pre-activated and pumped as an activated solution or slurry to the reactor. Dual reactors may be used in series or parallel, see U.S. Pat. No. 6,207,756, column 8 line 20 through column 14, line 21.

Other General Characteristics

The polymer preferably has an MFR of 0.5 to 200, especially from 1 to 100 or more especially 1 to about 50. The term "MFR" as used herein stands for "Melt Flow Rate" and is used to characterize polymers, components and compositions. The units for "MFR" are grams per 10 minutes and the test to be used herein for determining MFR is set forth in any version and condition set forth in ASTM-1238 that uses 2.16 kg at 230° C. with a 1 minute preheat on the sample to provide a steady temperature for the duration of the experiment. This data, expressed as dg of sample extruded per minute, is indicated as MFR. In an alternative procedure, the test is conducted in an identical fashion except at a temperature of 190° C. This data is referred to as MI@190° C. Where the MFR is so low as to defy measurement under these conditions, molecular weight may be determined using Mooney.

The Mooney viscosity, as used herein, is measured as ML(1+4)@ 125° C. according to ASTM D1646. As used herein, the term Mooney Viscosity (ML(1+4)@ 125° C.), or simply "Mooney Viscosity," is to be defined and measured according to the definition and measurement procedure set forth in U.S. Pat. No. 6,686,415, which is hereby incorporated by reference in its entirety, but particularly the text found in column 6, line 59 through column 7, line 59. Alternatively, any "Mooney Viscosity" value referenced herein (including those in the claims) is deemed to encompass any Mooney Viscosity measured in accordance with any recognized, published procedure for measuring Mooney Viscosity.

The polymer preferably has a molecular weight distribution $M_w/M_n$ (MWD), sometimes referred to as a "polydispersity index" (PDI), within the range having an upper limit of 40, or 20, or 10, or 5, or 4.5, and a lower limit of 1.5, or 1.8, or 2.0. The various molecular weight characteristics (e.g., Mw and Mn) and molecular weight distribution Mw/Mn (MWD) of the polymer components (or polymers) described herein can be measured in accordance with the procedures disclosed in U.S. Pat. No. 6,525,157, column 5, lines 1-44, which patent is hereby incorporated by reference in its entirety. Mz, Mw, and Mn can be measured using gel permeation chromatography (GPC), also known as size exclusion chromatography (SEC). This technique utilizes an instrument containing columns packed with porous beads, an elution solvent, and detector in order to separate polymer molecules of different sizes. In a typical measurement, the GPC instrument used is a Waters chromatograph equipped with ultrastyrogel columns operated at 145° C. The elution solvent used is trichlorobenzene. The columns are calibrated using sixteen polystyrene standards of precisely known molecular weights. A correlation of polystyrene retention volume obtained from the standards to the retention volume of the polymer tested yields the polymer molecular weight. Average molecular weights M can be computed from the expression:

$$M = \frac{\sum_i N_i M_i^{n+1}}{\sum_i N_i M_i^n}$$

where $N_i$ is the number of molecules having a molecular weight $M_i$. When n=0, M is the number average molecular weight Mn. When n=1, M is the weight average molecular weight Mw. When n=2, M is the Z-average molecular weight Mz. The desired MWD function (e.g., Mw/Mn or Mz/Mw) is the ratio of the corresponding M values. Measurement of M and MWD is well known in the art and is discussed in more detail in, for example, Slade, P. E. Ed., *Polymer Molecular Weights Part II*, Marcel Dekker, Inc., NY, (1975) 287-368; Rodriguez, F., *Principles of Polymer Systems 3rd ed.*, Hemisphere Pub. Corp., NY, (1989) 155-160; U.S. Pat. No. 4,540,753; Verstrate et al., *Macromolecules*, vol. 21, (1988) 3360; and references cited therein.

Physical Properties of the Polymer

The propylene based elastomeric polymer has a number of properties that help contrast its behavior in finished end use articles compared with other propylene-based polymers, on the one hand, and ethylene based elastomers, on the other hand. Tensile properties may be measured by ASTM method D-412 and the polymer can show considerable strength once extended, believed to be due to the progressive formation of propylene based crystalline areas. The tear strength may be high for similar reasons and can be measured using ASTM method D-624. The Flexural Modulus can be measured using ASTM method D-790 and will demonstrate considerable flexibility and fatigue resistance. Similarly, hardness measured using ASTM method D-2240 can be low as can the Vicat softening point measured using ASTM method D-1525. The density in g/cc is determined in accordance with ASTM 1505, based on ASTM D-1928, procedure C, plaque preparation, and indicates only a moderate crystallinity.

The propylene-based polymer can show controlled miscibility with other polymers depending on the molecular weight, the level of crystallinity and the monomer content.

Details of Possible Film Structures

The structures are preferably coextruded structures, most preferably formed by the cast film manufacturing process where the film after extrusion is taken up by chilled roller. The adhesive characteristics may depend on the extrusion conditions and other factors such as the type of comonomer incorporated, the thickness of the film, and the extractables content of the copolymer and resulting film. The films preferably have a thickness of from 25 to 100 μm. The surface layer of the films has a thickness of from 5 to 50 μm, preferably from 10 to 30 μm. The films preferably have at least three layers formed by coextrusion, with an adhesion imparting surface layer constituting from 10 to 60% of the overall thickness.

In some cases tackifying additives may be added in small amounts. These are defined herein as substances which provide sticky or adhesive qualities to copolymers, surfaces, films, or articles. Compressor oils and processing stabilizers such as antioxidants, UV stabilizers, antiblock agents, and the like are excluded from this definition. Compatible tackifying additives, if used, would be those which are miscible, or form homogeneous blends, with the polymers of the cling layer at conditions of fabrication and use. A wide variety of tackifying additives are known in the art and include, for example, polybutenes, polyisobutylenes, atactic polypropylenes, terpene resins, aliphatic and aromatic hydrocarbon resins, alkali metal and glycerol stearates, and hydrogenated rosins. In one embodiment, the surface layer of the film comprises from 2 to 25 wt % of a hydrocarbon tackifier grafted to incorporate polar moieties and preferably grafted with maleic anhydride. For more details on tackifiers, see U.S. Pat. Nos. 5,114,763, 5,154,981, 5,173,343, and 5,175,049. Notwithstanding this definition of tackifiers, an object of this invention is to provide a means of generally obtaining a film where the adhesive effect is achieved with a minimal use of either an ethylene non-acrylate copolymer or added tackifier.

The films may be "essentially free of tackifying additives," which can be defined as being less than 1 weight % tackifier.

The film provides a T-peel strength of from 0.5 to 5 N/25 mm, preferably 1 to 4 N/25 mm on any one or more of the following substrates glass, stainless steel (SS), polyurethane (PU), polycarbonate (PC), polymethylmethacrylate (PMMA), polyvinyl chloride (PVC), aluminum (Al), polyester (PET) and polyvinylidene fluoride (PVDF).

Films may be formed by any number of well-known extrusion or coextrusion techniques. For example, any of the blown or cast film techniques are suitable. As an embodiment of the invention, the copolymers may be extruded in a molten state through a flat die and then cooled. Alternatively, the copolymers may be extruded in a molten state through an annular die and then blown and cooled to form a tubular film. The tubular film may be axially slit and unfolded to form a flat film. The films of the invention may be unoriented, uniaxially oriented or biaxially oriented. Physical properties of the film may vary depending on the film forming techniques employed.

Multiple-layer films may be formed by methods well known in the art. If all layers are copolymers, the copolymers may be coextruded through a coextrusion feed-block and die assembly to yield a film with two or more layers adhered together but differing in composition. Multiple-layer films may also be formed by extrusion coating whereby a substrate material is contacted with the hot molten polymer as the polymer exits the die. For instance, an already formed polypropylene film may be extrusion coated with a copolymer film as the latter is extruded through the die. Multiple-layer films may also be formed by combining two or more single layer films prepared as described above. The total thickness of multilayer films may vary based upon the application desired. A total unstretched film thickness of about 0.4 to about 2.5 mils (about 10-63 microns), preferably from about 0.8 to about 2.0 mils (about 20-50 microns) is suitable for most applications.

There are many potential applications of films produced from the present copolymers. These films can be made into other forms, such as tape, by any one of a number of well known cutting, slitting, and/or rewinding techniques. They may be useful as sealing, or oriented films. The films may also be used in surface protection applications with or without stretching. The films are effective, especially in the temporary protection of surfaces during manufacturing, transportation, etc. The surfaces of the film of this invention can be modified by such known and conventional post-forming techniques such as flame treatment, corona discharge, chemical treatment etc.

EXAMPLES

The adhesive effect is determined by the standard AFERA 4001 peel test using a constant pressure roll of 2 kg deadweight, applied for 20 minutes which is removed in strips of 25 mm wide at an angle of 180° at a rate of 300 mm/min.

The films were prepared on cast coextrusion line equipped with three Collin single screw extruders having an L/D ratio of 25 to provide a backing layer of 20 μm, an intermediate layer of 10 μm and an adhesion providing layer of 20, 25, or 30 μm.

The polymers used were as follows:

TABLE 1A

Ingredients used

| | Type | MFR (230° C.) | MI (190° C.) | Comonomer Type/wt % | Density (gm/cm$^3$) |
|---|---|---|---|---|---|
| LD151BW | LDPE | N/A | 3 | N/A | 0.933 |
| Exceed 3518 CB | LLDPE | N/A | 3.5 | hexene/8.5 | 0.918 |
| Exceed 3527 CB | LLDPE | N/A | 3.5 | hexene/5 | 0.927 |
| Exact 8203 | Ethylene Copolymer | N/A | 3.0 | octene/29 | 0.882 |
| Vistamaxx 1100 | Propylene Elastomer | 3.0 | 1.3 | ethylene/15 | 0.860 |
| HYA800 | HDPE | N/A | 0.7 | N/A | 0.961 |

The tackifying resins and masterbatches thereof used were as follows:

TABLE 1B

| | Type | Molecular weight of resin component | Softening point of resin component | DSC Melting point | Density |
|---|---|---|---|---|---|
| OPPERA PR 104N | hydrogenated thermally polymerized C5 hydrocarbon resin | Mw approx. 400 | softening point 120-125° C. | N/A | approx. 1 |
| EMPA 861N | 50/50 blend of a MAH grafted aromatic modified hydrocarbon resin and Exact 8203 | MFR (125° C. 2.16 kg) 2.5 g/10 min Mw approx. 500 | softening point approx. 100° C. | 67-69° C. | approx. 0.94 |
| EMPA 851N | 50/50 blend of OPPERA 104N and Exact 8203 | MFR (125° C. 2.16 kg) 3.2 g/10 min | softening point approx. 120-125° C. | 64° C. | approx. 0.94 |

TABLE 1B-continued

| Type | | Molecular weight of resin component | Softening point of resin component | DSC Melting point | Density |
|---|---|---|---|---|---|
| OPPERA PA 610N | 50/50 blend of iPP homopolymer and a hydrogenated thermally polymerized C5 hydrocarbon resin | Mw calculated approx. 400 | softening point approx. 125° C. | N/A | approx. 0.94 |

The EMPA resins were produced in accordance with the procedures described in WO 03/025038.

TABLE 2

Coextrusions prepared

| Example | Non-adhering surface layer A | Middle layer B | Adhesion imparting surface layer C |
|---|---|---|---|
| Thickness (μm) | 20 | 10 | 20 |
| 1 | LD151BW | Exceed 3518 CB | Exact 8203 |
| 2 | LD151BW | Exceed 3518 CB | Vistamaxx ™ 1100 |
| 3 | Exceed 3527CB + 40% HYA800 | Exceed 3518 CB | Vistamaxx ™ 1100 |
| 4 | Exceed 3527CB + 2000 ppm talc | Exceed 3518 CB | Vistamaxx ™ 1100 |
| 5 | Exceed 3527CB + 2000 ppm talc | Exceed 3518 CB | Vistamaxx ™ 1100 |
| 6 | Exceed 3527CB + 2000 ppm talc | Exceed 3518 CB | Vistamaxx ™ 1100 + 20% Oppera PA610 |
| 7 Comparative | Exceed 3527CB + 2000 ppm talc | Exceed 3518 CB | Exact 8203 |
| 8 Comparative | LD151BW + 2000 ppm talc | Exceed 3518 CB | Exact 8203 |
| 9 Comparative | LD151BW + 2000 ppm talc | Exceed 3518 CB | Exact 8203 + 20% EMPA861N |
| 10 Comparative | LD151BW | Exceed 3518 CB | Exact 8203 + 20% EMPA851N |
| 11 Comparative | LD151BW | Exceed 3518 CB | Exact 8203 + 40% EMPA851N |

The TSP films were tested on a variety of substrates such as glass, stainless steel (SS), polyurethane (PU), polycarbonate (PC), polymethylmethacrylate (PMMA), polyvinyl chloride (PVC), aluminum (Al), polyester (PET) and polyvinylidene fluoride (PVDF). Adhesion to polyurethane was weak or none. Adhesion to other substrates varied in peel strength. Thickening the adhesion providing layer C from 20 μm to 25 μm or 30 μm improved the peel strength where needed. The reason for this may be that a thicker layer complies more readily to surface unevenness and/or a large area is available to resist peeling and reduced stress concentration. The peel strength can be increased also by adding a tackifier and especially a chemically modified tackifier. Where the peel strength is too high, it can be reduced by replacing Vistamaxx™ 1100 with Exact 8203 or similar.

The backing layer A could be modified to adapt and permit easy disengagement or release from the roll from which the TSP is applied (this layer will in the unrolled condition be in contact with the adhesion providing surface layer).

The TSP were also found to have good "immediate tack". That is to say, the adhesion was established immediately on contact with the substrate. There is no recognized test, but the surface layers containing Vistamaxx™ 1100 were noticeably superior to those of Exact polymers, a low density ethylene copolymer, in this regard.

The test results, which do not reflect any effort at optimization, are in the Table below. PU did not show adhesion. The thicker layers containing high amounts of tackifier had a tendency to leave deposits on the substrate after the T-peel test completion:

TABLE 3 test results

| Film example # | C layer thickness μm | Substrate | Peel force (N/25 mm) |
|---|---|---|---|
| 10 | 15 | PC | 2.9 |
| 10 | 20 | PC | 3.5 |
| 10 | 25 | PC | 3.1 |
| 10 | 30 | PC | 3.6 |
| 2-5 | 20 | PC | 1.7 |
| 6 | 20 | PC | 1.7 |
| 11 | 20 | PC | 6.5 |
| 10 | 20 | PC | 3.5 |
| 2-5 | 20 | PMMA | 2.0 |
| 6 | 20 | PMMA | 1.7 |
| 11 | 20 | PMMA | 5.9 |
| 10 | 20 | PMMA | 2.9 |
| 2-5 | 20 | Glass | 0.4 |
| 6 | 20 | Glass | 0.4 |
| 11 | 20 | Glass | 6.0 |
| 10 | 20 | Glass | 2.4 |
| 2-5 | 20 | SS | 0.3 |
| 6 | 20 | SS | 2.0 |

TABLE 3-continued test results

| Film example # | C layer thickness μm | Substrate | Peel force (N/25 mm) |
|---|---|---|---|
| 11 | 20 | SS | 3.8 |
| 10 | 20 | SS | 2.4 |
| 2-5 | 20 | PVC | 0.3 |
| 6 | 20 | PVC | 0.9 |
| 11 | 20 | PVC | 1.0 |
| 10 | 20 | PVC | 0.7 |
| 2-5 | 20 | Al | 0.1 |
| 6 | 20 | Al | 0.5 |
| 11 | 20 | Al | 0.6 |
| 10 | 20 | Al | 0.4 |
| 2-5 | 20 | PET | 0.3 |
| 6 | 20 | PET | 0.9 |
| 11 | 20 | PET | 0.6 |
| 10 | 20 | PET | 0.6 |
| 2-5 | 20 | PVDF | 0.4 |
| 6 | 20 | PVDF | 0.8 |
| 11 | 20 | PVDF | 1.0 |
| 10 | 20 | PVDF | 0.6 |

All patents and patent applications and other documents cited herein are fully incorporated by reference to the extent such disclosure is not inconsistent with this invention and for all jurisdictions in which such incorporation is permitted.

We claim:

1. A film for surface protection comprising:
   at least one base layer comprising a low density polyethylene or an interpolymer of ethylene and an alpha olefin having form 3 to 12 carbon atoms, a heat of fusion of at least 80 J/g, and a density of from 0.915 to 0.94 g/cm$^3$; and
   a surface layer for removably adhering to a substrate wherein the surface layer comprises:
   at least 40 wt % of an elastomeric propylene-based polymer comprising $\geqq$50 wt % propylene and 5-30 wt % ethylene derived units, having a hest of fusion derived from isotactic propylene type crystallinity as determined by DSC of less than 40 J/g;
   an ethylene-based polymer in the form of an ethylene-alpha-olefin copolymer having from 3 to 12 carbon atoms and a heat of fusion of less than 75 J/g and a density of less than 0.91 g/cm$^3$;
   an ethylene-vinyl ester copolymer having from 5 to 60 wt % of the ester derived units; and
   less than 40 wt % of a propylene based polymer having a heat of fusion of greater than 70 J/g;
   wherein the film has a thickness of from 25 to 100 μm and a T-peel strength of from 0.5 to 5 N/25 mm; and
   wherein the substrate is selected from the group consisting of glass, stainless steel (SS), polyurethane (PU), polycarbonate (PC), polymethylmethacrylate (PMMA), polyvinyl chloride (PVC), aluminum (Al), polyester (PET), and polyvinylidene fluoride (PVDF).

2. Film according to claim 1 in which the adhesive surface layer comprises from 5 to 30 wt % of a tackifier.

3. Film according to claim 1 in which the surface layer comprises from 2 to 25 wt % of a hydrocarbon tackifier grafted to incorporate polar moieties.

4. Film according to claim 1 in which the film comprises an intermediate layer between the base layer and the surface layer, wherein the intermediate layer comprises an interpolymer of ethylene and an alpha olefin having from 3 to 12 carbon atoms and a heat of fusion of at least 80 J/g and/or a density of from 0.915 to 0.94 g/cm$^3$.

5. Film according to claim 1 in which the base layer comprises an anti-cling, slip and/or anti-block additive.

6. Film according to claim 1 in which the surface layer has a thickness of from 5 to 50 μm.

* * * * *